2,851,463

DESALICETIN AND SALTS, AND HYDROCARBON CARBOXYLIC ACID ESTERS

Jack W. Hinman, Kalamazoo, Herman Hoeksema, Kalamazoo Township, Kalamazoo County, and William G. Jackson, Portage Township, Kalamazoo County, Mich., assignors to The Upjohn Company, Kalamazoo, Mich., a corporation of Michigan No Drawing. Application April 9, 1956
Serial No. 576,801

12 Claims. (Cl. 260—326.3)

This invention relates to a novel chemical compound and derivatives thereof, and to a method for the preparation of these compounds.

Celesticetin is a known antibacterial compound (Antibiotics Annual 1954–1955, pages 831 to 841) obtained as an elaboration product of Streptomyces celestis NRRL 2418. The compound is effective against many microorganisms and especially against various plant pathogens of economic significance such as Xanthomonas pruni, Phytomonas fasciculata, Phytomonas stewartii, and the like, and is further characterized by relatively low toxicity against the plant hosts.

It has now been found that celesticetin can be hydrolyzed by treatment with alkali to form a new compound, N - {2 - methoxy - 1 - [tetrahydro - 3,4,5 - trihydroxy-6-(2-hydroxy-ethylthio)-2-metho-pyran - 2 - yl]ethyl}hygramide, which is designated herein by the trivial name desalicetin and possesses the empirical formula of $C_{17}H_{32}N_2O_7S$ and is characterized by the following structure:

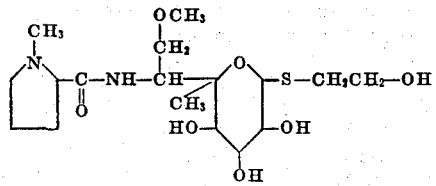

It has further been found that desalicetin, in turn, can be variously treated to prepare derivatives thereof.

It has been found that desalicetin and its derivatives, specifically, its esters and acid addition salts, posses antibacterial activity in vivo comparable to that of celesticetin. In vitro, desalicetin is only about one hundredth or so as active in inhibiting the growth of S. hemolyticus, D. pneumoniae, S. viridans and S. aureus as celesticetin. The marked in vivo activity, therefore, is very unusual and surprising especially since antibiotic moities, as a rule, are either inactive or have markedly lower activity than the antibiotic. Not only that, but desalicetin, its esters and acid addition salts are less toxic than celesticetin. In addition, desalicetin is useful in the resolution of racemic acids, e. g., d,l-mandelic and d,l-tropic acids.

In a broad embodiment of the invention, desalicetin is obtained by alkaline hydrolysis of either celesticetin or a celesticetin acid addition salt. Hydrolysis of the starting material is effected by contact thereof with an alkaline material, e. g., an alkali metal hydroxide such as sodium hydroxide, potassium hydroxide, lithium hydroxide, or the like, or an alkaline earth metal hydroxide such as calcium hydroxide, barium hydroxide, or an alkali-metal carbonate such as sodium carbonate, potassium carbonate, or the like. Hydrolysis to desalicetin is also effected when celesticetin or an acid addition salt thereof is brought into contact with or passed over a strongly basic anion exchange resin such as Dowex 2 (hydroxide form), a synthetic anion exchange resin containing quaternary ammonium groups attached to a styrene-divinyl benzene copolymer matrix; Dowex 1 (hydroxide form), a strongly basic anion exchange resin containing quaternary ammonium groups attached to a styrene-divinyl benzene copolymer; strongly basic alkylamine anion exchange resins such as Permutit S–1, Amberlite IRA–400, Nalcite SVR, Duolite A–40, and the like; quaternary alkanolamine anion exchange resins such as Permutit S–2, Amberlite IRA–410, Nalcite SAR, and the like. The desired product is isolated from the reaction medium and is utilized in the form of the free base or other derivatives prepared therefrom.

Celesticetin or an acid addition salt thereof is hydrolyzed at a pH between about 11.0 and about 13.0 and preferably at about 12.0. The reaction is usually conducted between about fifteen and about thirty degrees centigrade although higher temperatures can be used successfully.

Desalicetin can be recovered from the reaction medium by a variety of procedures. A typical recovery procedure comprises the following steps: adjustment of the reaction medium to a pH between about 1.0 and about 3.0 with a mineral acid such as hydrochloric acid, sulfuric acid, phosphoric acid, or the like, filtration of the resulting mixture to remove the insoluble salicylic acid, neutralization of the aqueous phase to a pH between about 7.0 and about 8.5 by the addition of an alkali-metal or alkaline earth metal hydroxide, concentration of the resulting solution to dryness followed by extraction of the residue with a lower-alkanol to secure the product in the form of a colorless brittle glass. When hydrolysis is effected by use of an ion exchange resin procedure, the resin is removed by filtration and the filtrate containing the substantially pure product is freeze dried.

Celesticetin (desalicetin salicylate ester), or the salicylate salt, can be hydrolyzed to desalicetin, and the free base isolated by another procedure. This method comprises the following steps. An aqueous suspension of celesticetin or an acid addition salt thereof, e. g., celesticetin salicylate salt and an alkaline earth hydroxide (i. e., calcium hydroxide) is protected from carbon dioxide and stirred at fifteen to thirty degrees centigrade until substantially complete hydrolysis to desalicetin results. The resulting mixture is acidified with oxalic acid to a pH of about 2 and filtered thereby removing the insoluble precipitates of salicylic acid and calcium oxalate. A wash (liquid-liquid extraction) can be used at this point to further remove salicylic acid from the filtrate. Any water-immiscible extractant for salicylic acid is suitable (i. e., butanol or ether). The washed aqueous solution of desalicetin oxalate is neutralized with calcium hydroxide and the insoluble calcium oxalate removed by filtration. Pure desalicetin free base is then obtained from this filtrate by freeze-drying.

On reacting desalicetin with an acyl halide, e. g., acetyl chloride, propionyl bromide, butyryl chloride, benzoyl chloride, lauroyl chloride, oleoyl chloride, and the like, or with an acyl anhydride, e. g., acetic anhydride, propionic anhydride, succinic anhydride, maleic anhydride, phthalic anhydride, and the like (in the presence of pyridine) there are obtained the corresponding esters, e. g., desalicetin tetraacetate, desalicetin tetrapropionate, desalicetin tetrabutyrate, desalicetin tetrabenzoate, tetralaurate, tetraoleate, tetra-(hemisuccinate), tetra-(hemimaleate) and tetra-(hemiphthalate), and the like. The tetra esters are obtained when at least four or more equivalents of the acylating agents are utilized. These esters are useful as antibacterials and for the resolution of optically active acids. When only one equivalent of acylating agent is used, the mono esters, involving only the primary hydroxyl group, are obtained, e. g., desalicetin monoacetate, desalicetin monopropionate, desalicetin monobutyrate, desalicetin monobenzoate, desalicetin monolaurate, desalicetin monooleate, desalicetin mono-(hemisuccinate), desalicetin mono-(hemimaleate), desalicetin mono-(phthalate), and the like. These esters also are useful as antibacterials and for the resolution of racemic acids such as d,l-mandelic and d,l-tropic acids. Desalicetin tetraacetate can be converted to its crystalline hydrochloric acid salt by reaction with dry hydrogen chloride. The other tetraesters as well as the monoesters can similarly be converted to their hydrochlorides. These salts are useful in purifying the free bases. Thus, the crude free base is converted to a crystalline salt which is recrystallized or otherwise purified, e. g., by solvent extraction, and then neutralized to spring the free base.

On reductive desulfurization of desalicetin tetraacetate with Raney nickel, there is obtained N-hygroylcelestitol triaceate which possesses the empirical formula $C_{15}H_{28}N_2O_6$ and is characterized by the following structure:

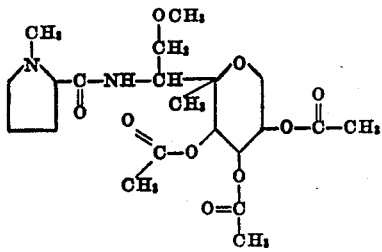

N-hygroylcelestitol triacetate can be used to resolve optically active acids. It can also be hydrolyzed in alkaline medium to N-hygroylcelestitol which is useful as a carbohydrate antimetabolite and in the resolution of racemic acids such as d,l-mandelic and d,l-tropic acids. N-hygroylcelestitol can be quaternized with a long chain alkyl halide, such as cetyl chloride, to form a cationic surfactant useful as detergents and wetting and dispersing agents. It can be reduced with lithium aluminum hydride to form a compound having the formula:

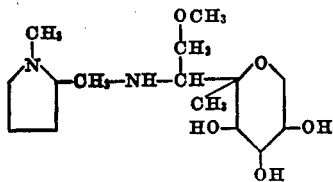

which is useful as an antihistaminic and in the resolution of optically active acids, such as d,l-mandelic and d,l-tropic acids. N-hygroylcelestitol can also be obtained by the reductive desulfurization of desalicetin. The triacetate can also be obtained by acylating N-hygroylcelestitol with acetic anhydride in the presence of pyridine. N-hygroylcelestitol and its triacetate are converted to the hydrochloric acid salts by reaction with dry hydrogen chloride.

By subjecting desalicetin to mild hydrolysis, for example, by refluxing with 3 N to 4 N sulfuric acid for short periods of time, i. e., less than one hour, there is obtained N-hygroylcelestose which has the empirical formula $C_{15}H_{28}N_2O_7$ and is characterized by the following structure:

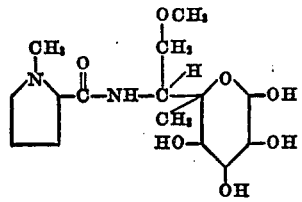

This compound is useful in resolving racemic acids such as d,l-mandelic and d,l-tropic acids and can be quaternized with long chain alkyl halides, such as cetyl chloride, to form cationic surfactants useful as detergents and wetting and dispersing agents.

On further acid hydrolysis of N-hygroylcelestose or by subjecting desalicetin to a prolonged acid hydrolysis for example, by heating under reflux with 3 N to 4 N sulfuric acid for fourteen to eighteen hours, there is obtained a $C_9H_{19}NO_6$ amino sugar, referred to as celestose, having the following formula:

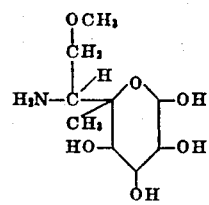

This compound is a reducing sugar which can be used for reducing silver solutions in the silvering of mirrors. It can be acylated with long chain fatty acid halides, such as oleoyl chloride, by the Schotten-Bouman reaction to form surfactants useful as detergents and wetting and dispersing agents. It can also be used to resolve racemic acids such as d,l-mandelic and d,l-tropic acids. When celestose is reacted with acetic anhydride in the presence of pyridine, there is obtained celestose pentaacetate ($C_{19}H_{29}NO_{11}$) in crystalline form melting between 234 and 234.5 degrees centigrade. When celestose pentaacetate is reduced with lithium aluminum hydride, there is obtained N-ethylcelestose which is useful in resolving racemic acids such as d,l-mandelic and d,l-tropic acids. By substituting a long chain acid halide for acetic anhydride there are obtained surfactants useful as detergents and wetting and dispersing agents. For example, from celestose and dodecanoyl chloride there is obtained N-dodecylcelestose.

On hydrogenation over Raney nickel or platinum oxide, celestose is converted to celestol, $CH_3OCH_2 \cdot CHNH_2 - C(CH_3)OH \cdot (CHOH)_3CH_2OH$ The celestol can be used in place of such substances as sorbitol, manitol, and pentaerythritol as a levigating agent in pharmaceutical compositions, as a humectant and softening agent for tobacco, glue, lotions and creams, and the like, and as a plasticiser. Like the prior art celestol is converted to surfactants useful as detergent and wetting agents by monoacylation with long chain fatty acid radicals. Celestol, monolaurate, monopalminate, monostearate and monooleate are examples of surfactants which can be prepared from the compounds of this invention. The like polyacylates, for example, the distearate, can be used as ointment bases. The capric acid mono ester when prepared and formulated according to U. S. Patents 2,357,077 and 2,357,078 is useful as an insecticide. The esters with drying oil acids, such as linseed oil acid, when prepared according to Ind. and Eng. Chem. 37, 809–12 (1954), are useful as drying oils in varnish and the like.

When N-hygroylcelestose is hydrolyzed or desalicetin is subjected to drastic acid hydrolysis by heating under reflux for about three hours with a strong mineral acid such as hydrochloric, sulfuric acid, or the like, hygric acid (Schulze and Trier, Z. Physiol. Chem. 67, 324, 1910) is obtained.

The following examples are illustrative only and the invention is not to be construed as limited in spirit or in scope by the details set forth therein. The parts are by weight and the solvents are anhydrous unless otherwise specified.

EXAMPLE 1

*Desalicetin*

Two grams (3.6 millimoles) of celesticetin was dissolved in ten milliliters of 0.5 N aqueous sulfuric acid and five milliliters of 95 percent ethanol. On the addition of 6.5 milliliters of 2 N aqueous sodium hydroxide, there was obtained a clear solution of a pH of 12.2. The solution was transferred to an Erlenmeyer flask using between five and ten milliliters of 95 percent aqueous ethanol and then allowed to stand at room temperature (about 25 degrees centigrade) for twenty hours. 5.2 milliliters of 6 N hydrochloric acid was added to the solution, the precipitate of salicylic acid thus formed was removed and the aqueous phase was adjusted to a pH of 7.5 by the addition of an aqueous sodium hydroxide solution. The solution was then extracted with three 25-milliliter portions of 1-butanol. The aqueous phase was then filtered, evaporated to dryness and extracted with absolute ethanol. On evaporation of the ethanol there was left 1.02 grams of desalicetin in the form of a brittle glass.

*Analysis.*—Calcd. for $C_{17}H_{32}N_2O_7S$: C, 47.87; H, 8.04; N, 6.57; S, 7.52. Found: C, 47.85, 47.92; H, 7.98, 7.43; N, 6.52; S, 7.33.

Desalicetin is stable at temperatures of four degrees and 25 degrees centigrade at a pH of five and seven, possesses an optical rotation $[\alpha]_D^{25}$ +175 degrees (c., 1.062 in ethanol), and is essentially pure as determined by countercurrent distribution analysis.

The countercurrent distribution analysis was effected by subjecting the preparation according to this example to a 199-transfer countercurrent distribution using a solvent system consisting of 2-butanol, water, and concentrated aqueous ammonia (29% $NH_3$) in the proportions of 10:9:1. A nearly theoretical curve was obtained indicating 94–95 percent purity. The peak occurred in tube 91 and the only impurities detected were traces of sodium chloride and water.

The infrared absorption spectrum of desalicetin in a mineral oil suspension exhibits characteristic absorption bands (expressed in reciprocal centimeters) at the following frequencies: 3320, 1650, 1525, 1346, 1305, 1235, 1202, 1135, 1077, 1049, 1010, 987, 899, 861, and 797.

When desalicetin is mixed in approximately stoichiometric amounts, and at a temperature range between about ten and about thirty degrees centigrade, with a strong mineral acid such as hydrochloric acid, sulfuric acid or phosphoric acid or an organic acid having a pKa value between about 2.5 and about 3.5, e. g., salicylic acid, succinic acid, oxalic acid, and the like, the corresponding acid addition salts are obtained.

EXAMPLE 2

*Desalicetin*

13.16 grams (about twenty millimoles) of celesticetin salicylate salt was dissolved in 100 milliliters of 1 N aqueous sodium hydroxide. After standing at room temperature for sixteen hours, the clear yellow solution was acidified to a pH of 3.0 by the addition of 2 N hydrochloric acid. The resulting white crystalline precipitate of salicylic acid was removed by filtration and the filtrate then extracted with ether. The aqueous phase was adjusted to a pH of 8.30 by the addition of four milliliters of 6 N aqueous sodium hydroxide. The clear solution was dried in vacuo and the residue extracted with absolute ethanol. After removal of the sodium chloride by filtration, the ethanol was removed in vacuo. There was thus obtained 8.12 grams of desalicetin in the form of a colorless brittle glass.

EXAMPLE 3

*Desalicetin and desalicetin oxalate*

Thirteen grams (175 millimoles) of calcium hydroxide was suspended in a two-liter Erlenmeyer flask containing 800 milliliters of water. An inert atmosphere was maintained by bubbling therethrough a small stream of nitrogen gas thereby preventing contamination with carbonate. 100 grams (150 millimoles) of celesticetin was added slowly to the rapidly stirred mixture. The resulting suspension was stirred for 102 hours to allow complete hydrolysis. To the hydrolyzed mixture was added 41 grams (325 millimoles) of oxalic acid dihydrate and the resulting suspension was filtered. The clear yellow filtrate thus obtained was washed with 200 milliliters of 1-butanol to remove residual salicylic acid. The filtrate was again washed with 1-butanol. To the washed filtrate of desalicetin oxalate was added calcium hydroxide until the pH of the solution was 11.1. The solution was filtered and then freeze dried. There was thus obtained 47.8 grams of desalicetin in the form of a brittle pale-straw slightly hygroscopic glass.

EXAMPLE 4

*Desalicetin*

Dowex-1 chloride was stirred with excess dilute sodium hydroxide for one hour followed by rinsing until the wash water was of a pH between 9 and 10. The resin was kept moist.

A 5.1 gram sample of celesticetin was dissolved in twenty milliliters of methanol and then diluted to a volume of fifty milliliters with water. The celesticetin solution was mixed with 25 milliliters of the above resin and ten milliliters of water. The resulting mixture was stirred at room temperature for about 21 hours. The resin was removed by filtration and then rinsed three times with small portions of water. The combined filtrates and wash water, a total volume of 75 milliliters, was then freeze dried to obtain desalicetin in substantially pure form.

EXAMPLE 5

*Desalicetin*

A solution containing 544 milligrams (0.815 millimole) of celesticetin in 4.2 milliliters of water was poured into 7.8 milliliters of Dowex-1 hydroxide from which free water had previously been drained. Five milliliters of methanol was added to dissolve the milky precipitate of celesticetin and also to prevent gumming of the resin. The mixture was diluted with water to a total volume of 25 milliliters, and then stirred overnight at room temperature.

The resin was removed by filtration and washed with small portions of water. The clear filtrate (including the wash water), a total volume of 45 milliliters, was then freeze dried. There was thus obtained desalicetin in substantially pure form.

EXAMPLE 6

*Desalicetin tetraacetate*

A solution containing 2.0 grams of desalicetin, five milliliters of acetic anhydride and 25 milliliters of pyridine was allowed to stand at room temperature for sixteen hours and then heated under mild reflux for three hours. After cooling to room temperature, the solution was diluted with water and neutralized with solid sodium bicarbonate. The resulting solution was then evaporated to dryness under reduced pressure. The residue was taken up with 100 milliliters of water and fifty milliliters of ether. The aqueous layer was then extracted with two additional fifty-milliliter portions of ether. After drying over anhydrous magnesium sulfate, the ether was evaporated in vacuo to yield 2.57 grams of desalicetin tetraacetate in the form of a yellow gum. The compound was soluble in ether, methylene chloride, ethanol, and methanol; slightly soluble in methyl cyclohexane; insoluble in water but soluble in 0.1 N hydrochloric acid.

EXAMPLE 7

*Desalicetin tetraacetate hydrochloride*

2.3 grams of desalicetin tetraacetate was dissolved in 150 milliliters of commercial anhydrous ether and hydrogen chloride gas was bubbled through the resulting solution. The crude salt was collected on a filter, washed with fresh ether and dissolved in about forty milliliters of chloroform by warming. The solution was filtered, layered with ether and then seeded. As the crystals separated, more ether was added until a total volume of about one liter was obtained. There was thus obtained 2.23 grams of crystalline desalicetin tetraacetate hydrochloride in the form of colorless crystals melting between 201 and 202 degrees centigrade.

Analysis.—Calcd. for $C_{25}H_{41}N_2O_{11}SCl$: C, 48.96; H, 6.74; N, 4.57. Found: C, 49.36, 49.50; H, 6.68, 6.72; N, 5.16, 5.2.

EXAMPLE 8

N-hygroylcelestitol and N-hygroylcelestitol hydrochloride

A stirred mixture of three grams of freshly prepared Raney nickel and one gram of desalicetin in 25 milliliters of ethanol was heated under reflux for one hour. The Raney nickel was removed and washed and the combined filtrate and washing was evaporated to dryness to obtain N-hygroylcelestitol. The product was dissolved in five milliliters of absolute ethanol and 0.8 milliliter of 2.8 N ethanolic hydrogen chloride was added. Three volumes of ether was then added. There was obtained 0.32 gram (36 percent yield) of N-hygroylcelestitol hydrochloride in the form of an amorphous precipitate.

Analysis.—Calcd. for $C_{15}H_{29}O_6N_2.HCl$: C, 48.84; H, 7.92; N, 7.60; Cl, 9.61. Found: C, 48.98, 48.14; H, 8.39, 8.61; N, 6.73; Cl, 9.30, 9.13.

EXAMPLE 9

N-hygroylcelestitol triacetate

Approximately fifteen grams of commercial Raney nickel was washed with three fifty-milliliter portions of 1 N citrate buffer (pH 3.0) followed by three fifty-milliliter portions of water. The washed catalyst was transferred to a flask containing 1.5 grams of crystalline desalicetin tetraacetate hydrochloride dissolved in thirty milliliters of 95 percent aqueous ethanol. About fifty milliliters of 95 percent aqueous ethanol was used to make the transfer. The resulting mixture was stirred magnetically and heated under reflux for two hours. The catalyst was then removed by filtration. After washing the nickel thoroughly with 95 percent aqueous ethanol, the washings and filtrate were concentrated in vacuo to a volume of about ten milliliters. An equal volume of water was added, the solution was adjusted to a pH of 8.5 with sodium hydroxide solution and then extracted with three fifty-milliliter portions of ether. The combined ether extract was dried over magnesium sulfate and evaporated. There was obtained 0.75 gram (a yield of 67 percent of N-hygroylcelestitol triacetate in the form of a colorless gum. The product thus obtained was converted to a friable colorless glass by rapid concentration of a methylene dichloride solution containing the gum.

Analysis.—Calcd. for $C_{21}H_{34}N_2O_9$: C, 55.0; H, 7.47; N, 6.11. Found: C, 54.68; H, 6.99; N, 5.85.

EXAMPLE 10

N-hygroylcelestitol triacetate hydrochloride 300 milligrams of N-hygroylcelestitol triacetate was dissolved in a mixture of fifteen milliliters of ether, and fifteen milliliters of technical hexane (Skellysolve B) and dry hydrogen chloride was bubbled through the solution thus obtained. A copious white precipitate which had been formed was collected, washed with ether and dried in vacuo. There was obtained 280 milligrams (86 percent yield) of a pure white product. After crystallization from chloroform and ether, N-hygroylcelestitol triacetate hydrochloride was obtained in substantially pure form melting between 224 and 226 degrees centigrade and characterized by an optical rotation $[\alpha]_D^{24}$ +42.0 degrees (c., 1.0 in water).

Analysis.—Calcd. for $C_{21}H_{35}N_2O_9Cl$: C, 50.95; H, 7.13; N, 5.66. Found: C, 50.85; H, 7.48; N, 5.65.

EXAMPLE 11

N-hygroylcelestose

A solution of 5.0 grams (915 millimoles) of celesticetin in 100 milliliters of 4 N sulfuric acid was heated under reflux for fifteen minutes. The resulting turbid solution was cooled quickly in an ice bath and extracted exhaustively with ether to remove the β-mercaptoethyl salicylate. The aqueous layer was warmed and stirred to expel dissolved ether, then heated under reflux again for thirty minutes. The ether extraction procedure was repeated. An aliquot of the ether solution was evaporated to dryness. The residue was dissolved in ethanol containing a few drops of 0.1 N sodium hydroxide and tested with sodium nitroprusside solution. A pink or violet color indicated the presence of a sulfhydryl compound.

A third period of heating proved sufficient to complete the hydrolytic removal of the sulfur containing moiety.

After standing overnight at room temperature, the reaction mixture was extracted with ether and then with methylene chloride to remove last traces of β-mercaptoethyl salicylate. It was then adjusted to pH 9.5 by the addition of saturated barium hydroxide aqueous solution. The barium sulfate precipitate was digested at fifty degrees centigrade for 45 minutes before removal by filtration. The pale yellow filtrate gave a negative nitroprusside test and a strong positive Benedict test. This filtrate was concentrated in vacuo from a volume of about one liter to about 100 milliliters and then refrigerated for about 48 hours. This concentrate was further concentrated to twenty milliliters, shell frozen, and lyophilized. There was thus obtained 2.94 grams (89 percent yield) of N-hygroylcelestose in the form of an amber glass.

Analysis.—Calcd. for $C_{15}H_{28}N_2O_7.H_2O$: C, 49.17; H, 8.25; N, 7.65. Found: C, 49.27; H, 8.54; N, 7.50.

EXAMPLE 12

Celestitol hydrochloride

A solution of 3.7 grams (10 millimoles) of N-hygroylcelestitol hydrochloride in 300 milliliters of methanolic hydrogen chloride (3 N) was heated under reflux for eight to ten hours. The solution was cooled and concentrated in vacuo to dryness to yield a mixture of 1-hygric acid hydrochloride and celestitol hydrochloride. The mixture was separated by fractional crystallization using methanol and ether as the solvents. Celestitol hydrochloride gave a positive ninhydrin reaction and a negative Benedict's test. On reaction with acetic anhydride in pyridine there is obtained celestitol tetraacetate which on alkaline hydrolysis yields N-acetyl celestitol.

EXAMPLE 13

Celestose

A solution of 790 milligrams (1.77 millimoles) of pentaacetyl celestose in 100 milliliters of 0.5 N hydrochloric acid was heated under reflux for 2.5 hours. The solution was cooled, stirred with activated charcoal and filtered through a Dicalite pad. The filtrate was concentrated to dryness in vacuo. The residue was redissolved in ca ten milliliters of water and the solution freeze-dried to yield celestose hydrochloride (350 milligrams; 80 percent) as a nearly white powder which gave a positive ninhydrin reaction and a positive Benedict's test. On reaction with acetic anhydride in pyridine there is obtained celestose pentaacetate which on alkaline hydrolysis yields N-acetylcelestose.

EXAMPLE 14

Celestol

A solution of 400 milligrams of celestose hydrochloride in 25 milliliters of 95 percent aqueous ethanol was hydrogenated at forty pounds per square inch gauge pressure in the presence of 100 milligrams of platinum oxide catalyst for sixteen hours. The solution was filtered free of catalyst and evaporated to yield 405 milligrams of celestol as a colorless viscous oil.

It is to be understood that the invention is not to be limited to the exact details of operation or exact compounds shown herein as obvious modifications and equivalents will be apparent to one skilled in the art. The invention is therefore to be limited only by the scope of the appended claims.

We claim:
1. Desalicetin, a nitrogenous base of the following structure:

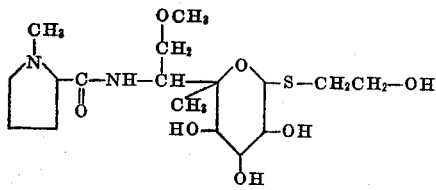

having in its pure crystalline form an optical rotation $[\alpha]_D^{25}$ +175 degrees (c., 1.062 in ethanol), and characteristic infrared absorption in a mineral oil suspension, at the following frequencies (expressed in reciprocal centimeters): 3320, 1650, 1525, 1346, 1305, 1235, 1202, 1135, 1077, 1049, 1010, 987, 899, 861, and 797.

2. A member selected from the group consisting of (1) desalicetin as characterized in claim 1 and its nontoxic acid addition salts, (2) esters thereof with hydrocarbon carboxylic acids containing not more than eight carbon atoms, and (3) esters thereof with fatty acids containing not more than 18 carbon atoms.

3. The tetraacetate of desalicetin, the nitrogen base characterized in claim 1.

4. The hydrochloride of the compound of claim 3.

5. A process which comprises contacting a member selected from the group consisting of celesticetin and an acid addition salt thereof with an aqueous alkaline material at a pH of between about 11 and 13 and at a temperature of about 15 to 30 degrees centigrade until substantial hydrolysis of the celesticetin is obtained.

6. A process for the preparation of desalicetin as characterized in claim 1 which comprises contacting celesticetin with an alkaline material in an aqueous medium until substantial hydrolysis to desalicetin is obtained.

7. A process for the preparation of desalicetin as characterized in claim 1 which comprises contacting an acid addition salt of celesticetin with an aqueous solution of alkali-metal hydroxide at a pH between about 11.0 and about 13.0 until substantial hydrolysis to desalicetin is obtained.

8. A process for the preparation of desalicetin as characterized in claim 1 which comprises contacting celesticetin salicylate with an aqueous solution of sodium hydroxide at a pH between about 11.0 and about 13.0 until substantial hydrolysis to desalicetin is obtained.

9. A process for the preparation of desalicetin as characterized in claim 1 which comprises contacting celesticetin with an alkaline-earth metal hydroxide in an aqueous medium at a pH between about 11.0 and about 13.0 until substantial hydrolysis to desalicetin is obtained.

10. A process for the preparation of desalicetin as characterized in claim 1 which comprises contacting an aqueous solution of celesticetin with a strongly basic anion exchange resin until substantial hydrolysis to desalicetin is obtained.

11. A process for the preparation of desalicetin as characterized in claim 1 which comprises contacting an aqueous solution of celesticetin with a strongly basic anion exchange resin in the hydroxide form, said resin containing functional quaternary ammonium groups attached to a styrene-divinyl benzene copolymer until substantial hydrolysis to desalicetin is obtained.

12. A process for the preparation of desalicetin as characterized in claim 1 which comprises contacting an aqueous solution of celesticetin salicylate with a strongly basic anion exchange resin in the hydroxide form, said resin containing functional quaternary ammonium groups attached to a styrene-divinyl benzene copolymer until substantial hydrolysis to desalicetin is obtained.

References Cited in the file of this patent
UNITED STATES PATENTS

| | | |
|---|---|---|
| 2,563,884 | Sugihara | Aug. 14, 1951 |
| 2,572,923 | Gaver et al. | Oct. 30, 1951 |
| 2,673,855 | Nager | Mar. 30, 1954 |
| 2,689,854 | Tanner et al. | Sept. 21, 1954 |
| 2,694,077 | Stansbury et al. | Nov. 9, 1954 |